United States Patent [19]

Templin

[11] 4,446,087

[45] May 1, 1984

[54] CONTINUOUS EXTRUSION OF PARAFFIN WAX

[75] Inventor: Philip R. Templin, Oakmont, Pa.

[73] Assignee: Gulf Research & Development Company, Pittsburgh, Pa.

[21] Appl. No.: 333,306

[22] Filed: Dec. 22, 1981

[51] Int. Cl.³ .............................................. B29C 17/00
[52] U.S. Cl. .................................... 264/148; 264/174; 264/330
[58] Field of Search ................. 264/148, 174, 178, 330

[56] References Cited

U.S. PATENT DOCUMENTS

| | | | |
|---|---|---|---|
| 2,457,088 | 12/1948 | Pinney | 264/174 |
| 2,583,938 | 1/1952 | French | 264/330 |
| 2,677,152 | 5/1954 | Terry, Jr. | 264/330 |
| 2,698,969 | 1/1955 | Keogh | 264/174 |
| 2,709,278 | 5/1955 | Greer | 264/330 |
| 2,754,543 | 7/1956 | Loew | 264/174 |
| 3,376,244 | 4/1968 | Rundle | 264/178 R |
| 3,925,029 | 12/1975 | Wilson | 264/330 |

Primary Examiner—Donald E. Czaja
Assistant Examiner—W. Thompson
Attorney, Agent, or Firm—Deane E. Keith; Forrest D. Stine

[57] ABSTRACT

Paraffin wax is continuously extruded through an extrusion die into a sag-free ribbon of good surface characteristics by extruding the wax at a temperature within the range of about 2° C. below and about 10° C. above the solid state transition temperature of the wax.

6 Claims, No Drawings

CONTINUOUS EXTRUSION OF PARAFFIN WAX

SUMMARY OF THE INVENTION

This invention relates to the continuous extrusion of paraffin wax at a rapid rate into a non-sagging ribbon of a substantially defect-free surface. In the process the paraffin wax is pressured through an extrusion die while it is in a fluid-free crystalline state at a temperature no more than about 2° C. below the solid state transition temperature and no higher than about 10° C. above the solid state transition temperature of the wax.

DESCRIPTION OF THE INVENTION

Paraffin wax is marketed for home and craft use in canning, making candles and various other utilitarian and craft applications. Paraffin wax is also extensively used in commercial applications such as food coating, packaging, paper sizing, rubber compounding, electric insulation and many other industrial uses. This paraffin wax is generally packaged as a stack of identical slabs of a convenient size for general use, small slabs for home use and large slabs for commercial use. These wax slabs are currently manually prepared in a batch-type operation by casting liquified paraffin wax in appropriately-sized, chilled molds. The individual slabs are broken out of the molds when they have solidified and are then arranged and packaged by hand. The preparation and packaging of these wax slabs is overall a labor-intensive operation.

Heretofore, it has not been practicable to produce paraffin wax slabs by a continuous extrusion process at an economically suitable rate and having a stable cross-section and a smooth, uniform surface. An important reason, in addition to salability, for being able to produce a non-sagging extrusion of good surface characteristics and stable cross-section is to ensure accurate weight for each constant-length slab. If the individual slab weights varied, the slabs could not be boxed in packages of uniform weight.

I have discovered a continuous process for the extrusion of wax at a high rate into a sag-free ribbon having a substantially defect-free surface. My extrusion process eliminates direct human involvement in the molding of the wax. In my procedure, wax is extruded through a die which will produce the desired contour, such as a die with a rectangularly shaped aperture. The die can be water-jacketed for control of the surface temperature of the exiting wax, either through the use of heating or cooling water. A critical feature of my process is the extrusion of the wax while it is in the plastic, semi-solid, fluid-free, orthorhombic crystalline state. The extruded wax is then cooled and cut into slabs or blocks of a uniform length. My process can be used to extrude wax ribbons having a cross-sectional area between about 0.5 and about 25 square inches, and preferably about one to about five square inches. The larger cross-sectioned dimension is generally no greater than about ten times, more generally no greater than five times, the smaller cross-sectional dimension.

Paraffin wax is a complex mixture of petroleum-derived, higher molecular weight aliphatic hydrocarbons which are solid at normal temperatures. These waxes contain a high proportion of straight-chain hydrocarbons and a low degree of branching generally restricted to a single monocarbon branch when branching is present. The paraffin wax and their individual molecular constituents generally have a melting point within the range of about 115° F. (46° C.) to about 155° F. (68.5° C.). AS a result of the overall purity of the paraffin waxes and the uniformity of their molecular structure, these waxes exhibit a somewhat unique volume-temperature cooling curve.

When liquidfied paraffin wax is cooled to a hard wax, there are three rather well-defined changes in its volume-temperature cooling curve. The first change is the crystal point where initial crystallization to the orthorhombic crystalline structure takes place. The second point is the solidification point where the last remaining liquid wax disappears. The solidification temperature substantially corresponds with the melting point, which is measured in a heating cycle. The wax at the solidification point is in an orthorhombic crystalline structure. Upon cooling to a paraffin wax below the solidification point, another change in the cooling curve soon takes place, which is designated the solid-state transition temperature. At this temperature, the crystalline structure of the solidified wax contracts from the orthorhombic to a monoclinic crystalline structure. At room temperature solid paraffin wax is in the monoclinic crystal form. The temperature range between the solid state transition temperature and the crystal point is generally between about 25 and about 60° F.

In order to effect an economically satisfactory extrusion of the wax, it is necessary that a high extrusion rate be established and be maintained, while producing an extruded ribbon which has good, smooth surface characteristics and which maintains the as-extruded cross-section through the post extrusion cooling phase. In order for an extrusion process to be economically attractive, the extrusion rate should preferably be at least about ten linear feet per minute, more preferably at least about twenty linear feet a minute.

I have found that this extrusion rate can be maintained with the production of an extruded ribbon having good surface characteristics and stable cross-section when the temperature of the wax during extrusion is maintained within narrow limits. I have found that the wax should have a temperature during extrusion of between about 2° C. below the solid state transition temperature and about 10° C. above the solid state transition temperature. Preferably the temperature during extrusion should be within the range of about the solid state transition temperature and about 5° C. above the solid state transition temperature. As used herein, the solid state transition temperature is that temperature at which solidified wax exhibits a significant decrease in volume during cooling. The solid state transition temperature can also be determined by X-ray diffraction, which will show a change in crystal structure.

The paraffin wax that is to be extruded may be available as a solid at ambient conditions. In this event the wax must be heated up at least as high as the extrusion temperature. On the other hand, the wax may be available in a molten state, and in this event the wax must be cooled down to the extrusion temperature.

It may be desirable to feed the solid wax to and through the extrusion die with a positive displacement pump, such as a gear pump, for maximum pumping efficiency. In order for the positive displacement pump to be used effectively, the wax should be in a liquid or semi-solid state as it is pumped. In this procedure, the wax must be cooled between the pump and the extrusion die to its extrusion temperature. The wax can suitably be solidified in a cylindrically-shaped heat exchanger having chilled walls. As the wax solidifies on the walls of the heat exchanger, it is scraped off by power-driven rotating doctor blades and is intermixed with the molten wax in the heat exchanger. A helically bladed scraper, which can be used, has the dual function of scraping the wax from the walls of the heat exchanger and of assisting the gear pump in advancing the wax towards and through the extrusion die. As the wax approaches and passes through the extrusion die, it is completely solid. I find it desirable to use a jacketed extrusion die so that a heating or cooling fluid can be applied to the die, if desired, to provide greater flexibility to the process. In general, I prefer to carry out the extrusion while the extrusion die is cooled with cooling water to help dissipate the small amount of heat generated by the extrusion process.

It is also possible to use a screw extruder within a tube or barrel-shaped body, provided that the pitch of the blade and the length of the screw is appropriate to overcome the resistance to extrusion at the desired extrusion rate and extrusion temperature. The wax can be fed to the screw extruder as chips at the desired extrusion temperature to avoid any requirement for a substantial heat exchange as it passes through the body of the screw extruder.

Since the extruded ribbon must be cooled for cutting and packaging, I find it desirable to positively cool the wax immediately following the extrusion. The cooling may be initially accomplished by directing one or more streams of cooling air, either ambient air or refrigerated air, onto the wax ribbon as it exits from the die. Substantial additional cooling can be effectively accomplished by passing the ribbon through a refrigeration chamber of sufficient length to provide the desired cooling. For more positive cooling and particularly when the extruding wax is in the higher range of the extrusion temperatures, it is possible to use water cooling such as is obtained with one or more sprays of cooling water directed onto the wax ribbon as it leaves the extrusion die and for a suitable distance following extrusion.

The wax ribbon can be cut into constant-length slabs or blocks while the ribbon is moving through the cooling zone or after the wax leaves the cooling zone, depending upon which procedure is more convenient for the specific overall extrusion operation being conducted. If desired, the ribbon can be passed through a set of rolls prior to cutting to ensure that the uniform desired cross-section is obtained. Once it is slabbed and cooled, and dried if water cooling is used, the slabs can be packaged.

DESCRIPTION OF PREFERRED EMBODIMENTS

EXAMPLES 1-3

A paraffin wax having a solid state transition temperature of about 35.6° C. and a specific gravity of 0.877 g/cc at this temperature was extruded using production extrusion equipment. The rectangular-shaped extrusion die with rounded corners had a cross-sectional area of about 1.2 square inches, with a die opening of about 2.5 inches by about 0.5 inches. A rotating crew extruder about three feet long and about four inches in diameter was used to feed the wax to the water-cooled extrusion die. The wax in chunk form and at the extrusion temperature were fed into the inlet hopper to the extruder. Despite cooling, there was a temperature increase in the wax in each run resulting from the extrusion process. The results are set forth in the following table, in which the ribbon speed and the production rate were approximate since they were not measured with laboratory precision.

TABLE

| Example | 1 | 2 | 3 |
|---|---|---|---|
| Screw speed, rpm | 7 | 25 | 42 |
| Charge wax, temp. °C. | 38 | 40 | 40 |
| Wax ribbon, temp. °C. | 40 | 44 | 44 |
| Die surface, temp. °C. | 38.5 | — | — |
| Ribbon speed, cm/min | 92 | 309 | 702 |
| Production rate, lbs/hr | 84.6 | 262 | 523 |

In each run the wax product has a good surface and conformed to the die aperture.

It is to be understood that the above disclosure is by way of specific; example and that numerous modifications and variations are available to those of ordinary skill in the art without departing from the true spirit and scope of the invention.

I claim:

1. A method of extruding paraffin wax at a high rate into a continuous ribbon of wax of constant cross-section and good surface which comprises feeding a material consisting essentially of paraffin wax through an extrusion die at a temperature between about 2° C. below the solid state transition temperature and about 10° C. above the solid state transition temperature of said was, said paraffin wax being in the orthorhombic crystalline state during extrusion, said wax being pressured through said extrusion die at an extrusion rate of at least about ten linear feet per minute, said extrusion die defining a cross-sectional area of between about 0.5 and about 25 square inches and having its maximum dimension no greater than about ten times its small dimension, whereby a solid ribbon of wax having good surface and good die conformation is produced.

2. A method of extruding paraffin wax at a high rate into a continuous ribbon of constant cross-section and good surface in accordance with claim 1 in which the wax is at a temperature between about the solid state transition temperature and about 5° C. above the solid state transition temperature.

3. A method of extruding paraffin wax at a high rate into a continuous ribbon of constant cross-section and good surface in accordance with claim 1 in which the extrusion die defines a cross-sectional area of between about one and about five square inches.

4. A method of extruding paraffin wax at a high rate into a continuous ribbon of constant cross-section and good surface in accordance with claim 1 wherein solid wax in the monoclinic crystalline form is heated up to the extrusion temperature and is fed by positive means through the extrusion die.

5. A method of extruding paraffin wax at a high rate into a continuous ribbon of constant cross-section and good surface in accordance with claim 1 wherein the extruded wax ribbon is air cooled following extrusion.

6. A method of extruding paraffin wax at a high rate into a continuous ribbon of constant cross-section and good surface in accordance with claim 1 in which the wax is extruded at an extrusion rate of at least about twenty linear feet per minute.

* * * * *

UNITED STATES PATENT OFFICE
CERTIFICATE OF CORRECTION

Patent No. 4,446,087                    Dated May 1, 1984

Inventor(s) Philip R. Templin

It is certified that error appears in the above-identified patent and that said Letters Patent are hereby corrected as shown below:

Col. 1, line 67, after "paraffin wax", insert --mixtures--;
Col. 2, line 2, "AS" should read --As--;
Col. 3, line 61, "crew" should read --screw--;
Col. 4, line 15, "has" should read --had--;
Col. 4, line 18, after "specific" delete ";" ;
Col. 4, line 31, "was" should read --wax--.

Signed and Sealed this

Twentieth Day of August 1985

[SEAL]

Attest:

DONALD J. QUIGG

Attesting Officer        Acting Commissioner of Patents and Trademarks